United States Patent [19]

Beauford, et al

[11] Patent Number: 5,343,407
[45] Date of Patent: Aug. 30, 1994

[54] NONLINEAR MODEL BASED DISTILLATION CONTROL

[75] Inventor: Martin H. Beauford; Jackie C. Watts, both of Borger, Tex.

[73] Assignee: Phillips Petroleum Company, Bartlesville, Okla.

[21] Appl. No.: 786,670

[22] Filed: Nov. 1, 1991

[51] Int. Cl.$^5$ ............................................. G06F 15/60
[52] U.S. Cl. ..................................... 364/501; 364/578
[58] Field of Search ........................ 364/501, 578, 151; 203/DIG. 18, 3

[56] References Cited

U.S. PATENT DOCUMENTS

| | | | |
|---|---|---|---|
| 3,294,648 | 12/1966 | Lupfer et al. | 203/2 |
| 3,594,559 | 7/1971 | Pemberton | 364/151 |
| 3,621,217 | 11/1971 | Carr et al. | 364/501 |
| 3,795,799 | 3/1974 | Courtiol | 364/150 |
| 3,828,171 | 8/1974 | Griffin | 364/501 |
| 3,960,707 | 6/1976 | Gross et al. | 364/501 |
| 4,358,822 | 11/1982 | Surchez | 364/151 |
| 4,526,657 | 7/1985 | Hobbs et al. | 203/3 |
| 4,639,853 | 1/1987 | Rake et al. | 364/150 |
| 4,866,632 | 9/1989 | Mead et al. | 364/501 |
| 5,132,918 | 7/1992 | Funk | 364/501 |

OTHER PUBLICATIONS

B. J. Cott et al. "Process Model Based Engineering", Computers Chemical Engineering, vol. 13, No. 9, pp. 973–984, 1989, Pergamon Press plc.
W. L. Luyben, "Process Modeling Simulation and Control for Chemical Engineers", McGraw-Hill, 1973, pp. 69–75.
B. J. Cott et al. "Process Model Based Control and Optimization of Binary Distillation Systems", AIChE, Mar. 25, 1987, Houston, Tex.
P. L. Lee, et al. "Generic Model Control", Computer Chemical Engineering, vol. 12, No. 6, Pergamon Press 1988.
T. J. Williams et al. "Automatic Control in Continuous Distillation", Industrial and Engineering Chemistry, vol. 48, No. 6, 1956, pp. 1008–1019.

*Primary Examiner*—Ellis B. Ramirez
*Attorney, Agent, or Firm*—George E. Bogatie

[57] ABSTRACT

In a fractional distillation process which performs a binary or limited multicomponent separation, and in which it is desired to maintain composition set points for dual product streams, a computer is programmed for applying model based control. Multivariable, noninteracting control of the distillation process is achieved by utilizing a nonlinear model, which calculates process vapor and distillate flow rates required to maintain product set points. The model, which applies tray-to-tray calculation essentially derived from a McCabe-Thiele analysis, is periodically updated by adjusting tray efficiency based on steady state composition measurements to keep the model in pace with changing process conditions. Guards to exceeding distillation process constraints, while keeping the distillation column running are provided by detecting the constrained condition, specifying which of the dual products is more valuable and then substituting constrained values for certain normally measured process variables used in the model calculations. In this manner, normal control actions are overridden when a process constraint is encountered.

8 Claims, 9 Drawing Sheets

NONLINEAR MODEL BASED DISTILLATION CONTROL

This invention relates to controlling the operation of a distillation column. In one aspect, it relates to a method and an apparatus for applying multivariable noninteracting control to a distillation column. In another aspect, it relates to a nonlinear distillation model for on-line computation of steady state variables, which are then fixed until recalculated, and which are used to determine set points for conventional linear controllers.

BACKGROUND OF THE INVENTION

There is considerable activity in the art of fractional distillation to improve the operation of a column so that products with desired purity specifications can be produced for minimum operating costs. Optimizing the operation of a distillation column is complicated, however, because of the column's numerous degrees of freedom, which are characterized as independent input variables, some of which, such as feed temperature and reboiler heat flow, are controllable, while others such as ambient temperature and feed composition are uncontrollable.

High purity distillation has long been recognized as presenting one of the most difficult control problems in the petroleum and chemical processing industries. This is because high purity distillation columns are extremely nonlinear and exhibit extreme nonlinear coupling. As an example of the nonlinear nature of high purity distillation, a 10% increase in boilup rate will result in only a moderate increase in the purity of the bottoms product, while a 10% decrease would cause a drastic decrease in the purity of the bottoms product. In addition, a 10% increase in boilup by itself will cause a drastic reduction in the purity of the overhead product.

High purity distillation, however, is an industrially relevant process because it is used to produce high purity feed stocks for processes that must have such feed stocks in order to operate properly and economically. For example, ethylene, propylene and styrene monomers of nearly 100 percent purity are required for their respective polymerization processes in order to produce polymers with the desired characteristics. Also, for the production of industrial grade acetic acid, levels of less than 200 ppm propanoic acid impurity must be maintained. In addition, chemical intermediate xylene products are typically produced as high purity products. Ethylene oxide and propylene oxide are separated industrially to produce products, each with about 200 ppm impurities.

One of the more important independent variables of a distillation column is the reboiler heat input. This is because distillation is a thermal process, and reboiler heat input may be manipulated to compensate for disturbances in other uncontrollable variables, such as changes in feed composition and feed flow rate. Reflux flow rate is another important independent variable affecting separation which may also be manipulated to compensate for disturbances in the uncontrollable variables. A control system having capability for simultaneously manipulating two variables, such as heat input and reflux flow rate, so as to maintain dual product specifications would be highly desirable.

Industry mainly relies on the classical proportional-integral-derivative (PID) controller or else a linear model based controller for multivariable control applications. Model based controllers, however, provide improved performance over PID controllers in many control applications because it is feasible to automatically update the model to match changing process operating conditions. This permits maintaining near optimum tuning over wide ranges of a process variable. Further, nonlinear models can account for both the nonlinearities of the column and the interactions between manipulated variables of the column to improve control performance compared to systems employing linear models.

It has been demonstrated, however, that dual composition control of a fractional distillation column can be achieved by implementing a nonlinear process model based control (PMBC) strategy wherein tray-to-tray calculations essentially corresponding to the McCabe-Thiele analysis are used to compute liquid and vapor flow rates required for controlling the distillation column. The computer based process model for the PMBC, which is periodically updated within the control strategy, is a steady state approximate model utilizing a mechanistic tray-to-tray calculation, which applies equilibrium and mass balance relationships existing in the column to compute effective control actions. The model is updated based on measured steady state process variables to keep pace with changing operating conditions. The process model is implemented in a supervisory computer control scheme where variables such as the column reflux to distillate flow ratio and the reboiled vapor to bottoms flow ratio are manipulated by the model based controller to maintain desired compositions for distillate and bottoms product streams.

In implementing PMBC, target compositions, which will rapidly return dual product streams to desired compositions, are periodically computed using a generic model control equation which includes proportional, integral and derivative tuning factors. The process model is solved for multiple process flow rates which will satisfy the computed target compositions. The solution includes an update mode for determining an overall tray efficiency of the column by estimating initial values of tray efficiency, calculating tray-to-tray compositions in the stripping section and in the rectifying sections based on the estimated efficiency and measured steady state vapor rates, and then iteratively selecting trial efficiencies which cause a tray composition error between stripping and rectifying section calculations to converge to an acceptable value. This composition error at the feed tray, which is herein referred to as a convergence error, reconciles composition calculations between rectifying and stripping sections of the column. In a similar manner, the model solution includes a control action mode in which a required vapor rate is determined by estimating initial values for vapor rate and calculating tray-to-tray compositions based on estimated vapor rates and the tray efficiency determined in the update mode, and then iteratively selecting vapor rates to achieve a desired convergence error. Accordingly, two general calculation steps are involved in implementing PMBC:

(1) Model parameter update which selects tray efficiency to be adjusted based on measured steady state flow rates and compositions from the column, and (2) control action calculations utilizing the adjusted tray efficiency to determine set points for flow rates external to the column which serve as manipulated variables.

While nonlinear model based control for binary distillation has proven effective for simultaneously moving dual product compositions toward their respective set points, considerations for realistic control limitations are necessary to maintain control effectiveness. Such realistic considerations include possible constraints on control action moves such as the column vapor rate being constrained by limited heat input or heat removal, pump limiting, etc. Also attention to tuning of computer algorithms such as the generic model control equation, which is embedded in the distillation model, must be realistically considered.

Accordingly it is an object of this invention to improve control of a distillation column by using a nonlinear process model which is effectively tuned for dual product composition control.

It is another object of this invention to operate a distillation column within control action constraints while utilizing nonlinear model based control strategy.

SUMMARY OF THE INVENTION

In accordance with one aspect of this invention, guards to exceeding distillation process constraints in a model based controller for dual composition control while keeping the distillation column running, are provided by detecting the constraint condition, specifying which of the dual products is more valuable, and then substituting constrained values for certain normally measured process variables which are used in the model control action calculations. The constrained variable values are also used in model update calculations in which column tray efficiency is determined. Further, based on values of the constrained variables, a convergence error at the feed tray between tray composition calculations in rectifying and stripping sections of the column is determined. The convergence error is iteratively adjusted to a desired minimum value. In this manner, normal control actions are overridden when a process constraint is encountered.

In another aspect of this invention, it has been found that providing separate sets of individually tuned generic model control equations for respectively calculating material balance and heat balance control actions can compensate for dynamic imbalance between the material and heat balance control actions.

In a preferred embodiment of this invention for operation when the vapor rate is constrained and the distillate is selected as the top priority product, the vapor rate used in the model calculation is set to the constrained rate and the bottoms composition is set to a small value such as 0.001 mf for calculating an initial convergence error. In a similar manner, the vapor rate used in the model calculation for a second convergence error is maintained at the constrained rate and the bottoms composition is set to 0.3 mf, so that the first and second convergence errors, based on constrained values of composition, will straddle a zero value. If the column bottoms is selected as the top priority product, constrained rates are set in the model for distillate composition.

Further, in a preferred embodiment of this invention, four generic model control equations, which each contain proportional, integral and derivative tuning factors, are individually tuned for calculating target compositions $X_{ss}$, $Y_{ss}$, $X_{ssm}$, $Y_{ssm}$, where X and Y are bottoms and distillate compositions respectively and the subscripts ss and ssm indicate steady state heat balance and material balance, respectively.

DETAILED DESCRIPTION OF THE INVENTION

The invention is illustrated and described in terms of a specific fractional distillation process for the separation of isopentane and n-pentane. The invention, however, is applicable to any binary (i.e. two component) fractional distillation process in which it is desired to maintain a desired distillate product composition and a bottoms product composition, and is particularly applicable to those processes wherein close boiling components of low relative volatility are separated.

The invention is also applicable to multicomponent separation processes which are substantially binary in feed composition or can be mathematically considered as psuedo-binary.

The invention is further described in terms of a process model based upon a binary separation but which can be applied to most distillation which produce two products from a multicomponent feed stream.

Figure 1:
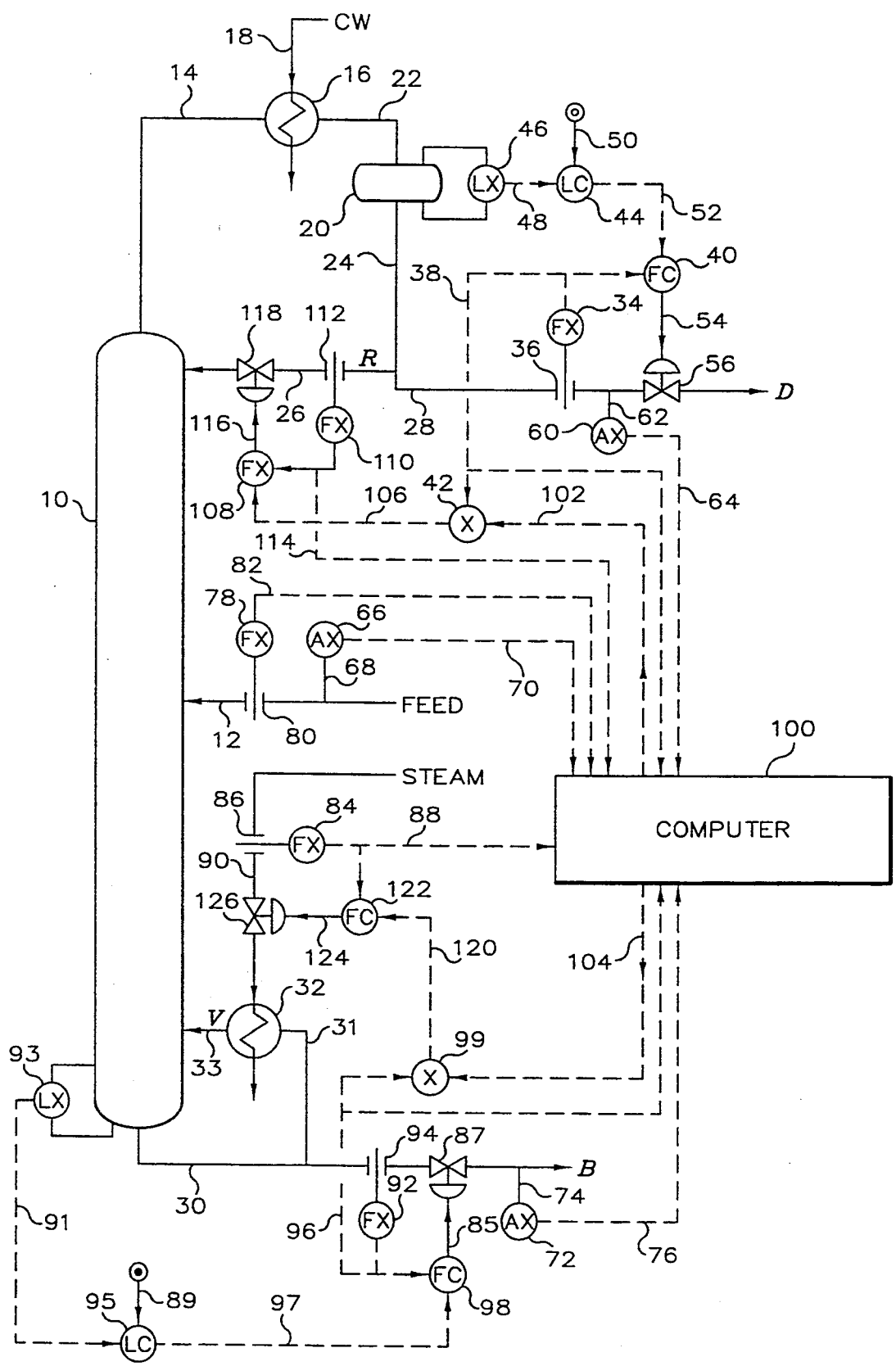
FIG. 1 is a diagramatic representation of a fractional distillation process with the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form, it must be transduced to electrical form if it is to be transmitted in an electrical form by a flow transmitter.

The invention is also applicable to mechanical, hydraulic or other signal means for transmitting information. In almost all control systems, some combination of electrical, pneumatic, mechanical or hydraulic signals will be used. However, use of any other type of signal transmission, compatible with the processing equipment, is within the scope of the invention.

A digital computer, which is provided with a mathematical model of the process, is used in the preferred embodiment of this invention to calculate the required control signals, based on measured process variables and parameters, as well as set points supplied to the digital computer. Any digital computer having software that allows operation in a real time environment for reading values of external variables and transmitting signals.

Signal lines are also utilized to represent the results of calculations carried out in the digital computer and the term "signal" is utilized to refer to such results. Thus, the term signal is used not only to refer to electrical currents or pneumatic pressures, but it is also used to refer to binary representations of a calculated or measured value. The level and flow controllers shown in FIG. 1 may be pneumatic, electronic, digital electronic, distributed computer elements, each of the controllers, however, may utilize the various conventional modes of control, such as proportional-integral or proportional-integral-derivative. In this preferred embodiment, proportional-integral-derivative (PID) controllers are used.

The scaling of an output signal in a PID controller is well known in the control systems art. Essentially the output of a PID controller may be scaled to represent any desired factor or variable. An example of this is where a desired flow rate and an actual flow rate are compared by a controller. The controller output can be a signal representative of a desired change in the flow rate of some gas necessary to make the desired and actual flow equal. On the other hand, the same output signal could be scaled to represent a percentage or could be scaled to represent a temperature change required to make the desired and actual flows equal.

The various transducing means to measure parameters which characterize the process and the various signals generated thereby, may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiments of the invention utilize a combination of pneumatic final control elements in conjunction with electrical analog signal handling and translation apparatus, the apparatus and method of the invention can be implemented using a variety of specific equipment available and understood by those skilled in the process control art. Likewise, the format of the various signals can be modified substantially in order to accommodate signal format requirements of the particular installation, safety factor, the physical characteristics of the measuring or control instrument and other similar factors. For example, a measurement signal produced by a differential orifice flow meter would ordinarily exhibit a generally proportional relationship to the square of the actual flow rate. Other measuring instrument might produce a signal which is proportional to the measured parameter, and still other transducers may produce a signal which bears a more complicated, but known, relationship to the measured parameter. Regardless of the signal format or the exact relationship of the signal to the parameter which it represents, each signal representative of a measured process parameter, or representative of a desired process value will bear a relationship to the measure parameter or desired value which permits designation of a specific measured or desired value by specific signal value. A signal which is representative of a process measurement or a desired process value is, therefore, one from which the information regarding the measurement or desired value can be readily retrieved, regardless of the exact mathematical relationship between the signal units and the measured or desired process units.

Referring now to the drawing, and in particular to FIG. 1, there is illustrated a fractional distillation column 10. A feed stream consisting essentially of a mixture of isopentane ($iC_5$) and normal pentane is provided to the fractional distillation column 10 through conduit 12. A distillate vapor stream enriched in isopentane is withdrawn from the fractional distillation column 10 through conduit 14 and is provided to the heat exchanger 16. Heat exchanger 16 is provided with a cooling medium flowing through conduit 18. Condensed fluid from the heat exchanger 16 is provided to the overhead accumulator 20 through conduit 22. Liquid in accumulator 20 is withdrawn through conduit 24 and a desired portion of the liquid flowing in conduit 24 is provided as an external reflux to fractional distillation column 10 through the combination of conduits 24 and 26. The remaining portion of the fluid flowing from conduit 24 is provided as the distillate product stream from the fractional distillation column 10 through the combination of conduits 24 and 28. A bottoms product stream is withdrawn from the fractional distillation column 10 through conduit 30. Heat is supplied to the fractional distillation column 10 by a heating medium flowing through heat exchanger 32. A portion of the bottoms product is withdrawn from conduit 30, passed to heat exchanger 32 via conduit 31 where the liquid is vaporized and returned to the lower portion of column 10 via conduit 33.

The flow transducer 34 in combination with a flow sensor 36 provides an output signal 38 which is representative of the actual flow rate of the distillate product flowing through conduit 28. Signal 38 is provided from the flow transducer 34 as a process variable input to flow controller 40, and is also provided as a first input to the multiplying block 42. As illustrated in FIG. 1, flow controller 40 is manipulated by liquid level controller 44, which is operatively connected to control the level in accumulator 20, so as to maintain a desired liquid level in accumulator 20. Level transducer 46 provides an output signal 48 which is representative of the actual liquid level in accumulator 20. Signal 48 is provided from the level transducer 46 as a process variable input to level controller 44. Level controller 44 is also provided with an operator supplied set point signal 50, which is representative of the desired liquid level for accumulator 20. In response to signals 48 and 50, level controller 44 provides an output signal 52 which is representative of the difference between signals 48 and 50. Signal 52, which is scaled so as to be representative of the flow rate of distillate product in conduit 28 required to maintain the actual liquid level in accumulator 20 substantially equal to the desired level represented by signal 50, is provided as a set point signal to flow controller 40. In response to signals 52 and 38, flow controller 40 provides an output signal 54 which is responsive to the difference between signals 52 and 38. Signal 54 is scaled so as to be representative of the position of control value 56 required to maintain the actual flow rate in conduit 28 substantially equal to the desired flow rate as represented by signal 52. Signal 54 is provided as a control signal to the control valve 56.

Analyzer transducer 60, which is in fluid communication with conduit 28 through conduit 62, provides an output signal 64 which is representative of the concentration of the heavy key component isopentane flowing through conduit 28. Signal 64 is provided from analyzer 60 as an input signal to computer 100. In a similar manner, analyzer transducer 66 is in fluid communication with feed conduit 12 through conduit 68, and analyzer 66 provides an output signal 70 which is representative of the concentration of the light key component $iC_5$ flowing in feed conduit 12. Signal 70 is provided from analyzer transducer 66 as an input to computer 100. Further, analyzer transducer 72 is in fluid communications with the bottoms product stream flowing in conduit 30 through conduit 74, and analyzer transducer 72 provides an output signal 76 which is representative of the concentration of the light key component isopentane flowing in the bottoms product stream 30. Signal 76 is provided from analyzer transducer 72 as an input to computer 100.

Flow transducer 78 in combination with a flow sensor 80 provides an output signal 82 which is representative of the flow rate of the feed stream flowing in conduit 12. Signal 82 is provided from flow transducer 78 as an input to computer 100. In a similar manner, flow transducer 84 in combination with a flow sensor 86 provides an output signal 88 which is representative of the flow rate of stream flowing in conduit 90. Signal 88 is provided from flow transducer 84 as another input to computer 100.

Flow transducer 92 in combination with flow sensor 94 provides an output signal 96 which is representative of the actual flow rate of bottoms product flowing in conduit 30. Signal 96 is provided from flow transducer 92 as an input to flow controller 98, and is also provided as a first input to multiplying block 99. As illustrated in FIG. 1, flow controller 98 is manipulated by the output 97 of liquid level controller 95. Level controller 95 is operatively connected to control the liquid level in the lower portion of column 10, so as to maintain a desired liquid level in column 10. Level transducer 93 provides an output signal 91 which is representative of the actual liquid level in column 10. Signal 91 is provided from the level transducer 93 as a process variable input to level controller 95. Level controller 95 is also provided with an operator entered set point signal 89 which is representative of the desired liquid level for column 10. In response to signals 91 and 89, level controller 95 provides an output signal 97 which is representative of the difference between signals 89 and 91. Signal 97 is scaled, so as to be representative of the flow rate of bottoms liquid flowing in conduit 30 required to maintain the actual liquid level in column 10 substantially equal to the desired value represented by set point signal 89. Signal 97 is provided from level controller 95 as a set point input signal to flow controller 98. In response to signals 96 and 97, flow controller 98 provides an output signal 85 which is responsive to the difference between 96 and 97. Signal 85 is scaled, so as to be representative of the position of control value 87 required to make the actual flow in conduit 30 substantially equal to the desired bottoms product flow represented by signal 97. Signal 85 is supplied from flow controller 98 as a control signal 85 to control value 87 and control value 87 is manipulated in response to signal 85.

In response to the above described measured analysis signals 64, 70 and 76, measured flow signals 82 and 88, as well as other signals representative of composition set points and system constants, as will be described hereinafter, computer 100 provides output control signals 102 and 104. Signal 102 which is representative of a desired reflux (R) to distillate (D) ratio is provided as a second input to multiplying block 42. Signal 102 is multiplied by signal 38 in multiplying block 42 to provide an output signal 106 which is representative of the desired flow rate of reflux (R) flowing in conduit 26. Signal 106 is provided from multiplying block 42 as a set point signal for flow controller 108. Flow transducer 110 in combination with a flow sensor 112 provides an output signal 114 which is representative of the actual flow rate of reflux flowing in conduit 26. Signal 114 is provided as a process variable input to flow controller 108. In response to signals 106 and 114, flow controller 108 provides an output signal 116 which is responsive to the difference between 114 and 106. Signal 116 is scaled, so as to be representative of the position of control value 118 required to maintain the actual flow of reflux in conduit 26 substantially equal to the desired flow rate represented by signal 106. Signal 116 is provided from flow controller 108 as a control signal to control valve 118, and control valve 118 is manipulated in response to signal 116.

In a similar manner, signal 104, which is representative of the desired steam (S) to bottoms (B) ratio, is provided as a second input to multiplying block 99. Signal 104 is multiplied by signal 96 in multiplying block 99 to provide an output signal 120 which is representative of the desired flow rate of vapor (V) flowing in conduit 33. Signal 120 is provided from multiplying block 99 as a set point input to flow controller 122. Signal 88, which as previously stated as representative of the flow rate of steam in conduit 90, is provided as a process variable input to flow controller 122. In response to signals 120 and 88, flow controller 122 provides an output signal 124 which is responsive to the difference between signals 88 and 120. Signal 124 is scaled, so as to be representative of the flow rate of steam required to maintain an actual flow rate of vapor in conduit 33 substantially equal to the desired flow rate represented by signal 120. Signal 124 is provided from flow controller 122 as a control signal to control valve 126, and valve 126 is manipulated in response to signal 124.

Thus far, in conjunction with FIG. 1, there has been described a conventional distillation column, which by itself does not constitute the subject of this invention. It is the implementation of the nonlinear process model based control algorithm that provides the novel features of this invention. The object of the distillation column, of course, is to separate a multi-component feed stream (F) into at least two fractions, such as a distillate fraction and a bottoms fraction, which can be withdrawn from the distillation column as a distillate product stream (D) and a bottoms product stream (B). The principal light component of the feed, along with any components lighter (lower boiling) than the principal light component, will appear mainly in the overhead distillate fraction, and the principal heavy component of the feed, along with any components heavier (higher boiling) than the principal heavy component, will appear mainly in the bottoms fraction. Separation of the feed components is effected by adding heat to liquid in the base of the column or in a separate reboiler. In either instance, the heat input generates a reboiled vapor stream (V) that rises stepwise up the column by condensing in the liquid on each plate and vaporizing a thermally equivalent quantity of liquid. The vapors from the top plate go to a condenser, with part of the condensate drawn off as a distillate product stream (D) and the remainder returned to the column as a reflux stream (R). Since perfect separation between the light and heavy key components of the feed is impossible, some of the principal key heavy feed components will appear as an impurity in the overhead product, and similarly some of the principal light key component of the feed will appear as an impurity in the bottoms product. The concentration of these impurities, however, can be maintained at or below desired levels by proper operation of the distillation column.

Variables available for manipulation, which are of primary concern in this invention, include the external streams R, D, B, V and the ratios V/B and R/D. Steady state values for two of these variables or ratios, which will compensate for uncontrolled fluctuations in purity of products, can be predicted based on well known tray-to-tray binary distillation calculations.

Briefly discussed here, various distillation design methods are known which involve rigorous calculation of distillation variables under steady state and/or dynamic conditions. These designs are discussed e.g. in "Perry's Chemical Engineer's Handbook", Chapter 13, Sixth Edition. The steady state design of a multi-tray column, however, can be accomplished based on tray-to-tray calculations utilizing equilibrium vaporization and mass and component balance relationships. While this latter mentioned design technique using tray-to-tray calculations may lack rigorousness for certain columns, it may be reliably used to estimate steady state operation for distillations which yield two product streams from a multi-component feed stream. The set of equations resulting from the tray-to-tray calculations (i.e. the process model) are nonlinear, and typically require "trial and error" techniques for solution. While any suitable method may be utilized for solution of the model equations, it is presently preferred to utilize an iterative technique known as "regula falsi" which is a method of calculating an unknown quantity by first making an estimate and then using this estimate and the properties of the process to obtain the unknown quantity. Computation time required for solution in commercially available control computers is suitable for "on line" implementation of the tray-to-tray model.

The steady state process flow variables calculated in accordance with the nonlinear model are used for determining set points for conventional linear controllers whose measured variables may be distillate or bottoms product flow rates, reflux rate, vapor rate or ratios of these flow rates. Variables selected for manipulation, as illustrated in FIG. 1, are ratios of reflux to distillate flow and reboiled vapor to bottoms flow.

In accordance with this invention, measurements are made of the feed flow rate and the mole fraction of the principal components in the feed stock, along with similar measurements for the distillate and bottoms product streams. If desired, the mole fraction of the principal component of the feed stream may be inferred from material balance considerations. Also measured is the heat input to the bottom of the column. Signals are established proportional to these variables, and these measured signals are combined with other signals proportional to certain process constants for use in the control computer and further in a routine for updating critical parameters in the pre-stored nonlinear model. Computer based model solutions then yield steady state values for the selected process variables which can simultaneously move compositions of both distillate and bottoms product streams toward their respective set points without interaction between the distillation variables.

Figure 2:
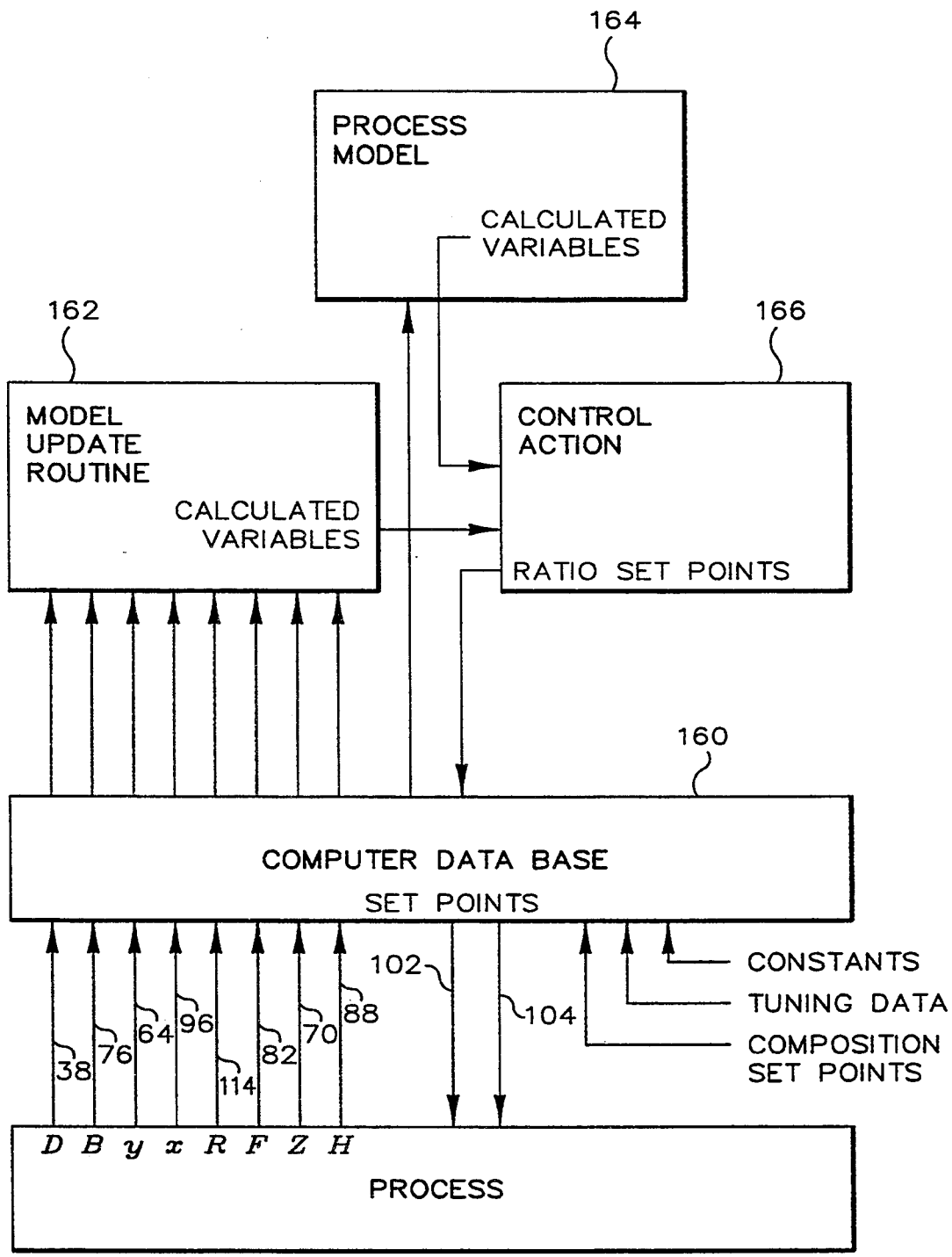
FIG. 2 is a block diagram of the computer memory for model based distillation control showing organization of data storage and control programs.

Referring now to FIG. 2, the computer memory may be generally organized as illustrated in FIG. 2, to provide a data base section 160 for accepting and storing data which can be used by the various programs stored in the computer. The data comprise measured variables 38, 76, 64, 96, 114, 82, 88 and 70 which are also illustrated in FIG. 1, along with operator entered composition set points and adjustable constants, as illustrated in Table I, and tuning data for generic model control, as will be explained more fully hereinafter. The computer data base 160 may under program control transfer data to and from the model update routine 162 and the process model 164. Further illustrated in FIG. 2 is a control action section 166, which can receive calculated values for variables from the update routine 162, as well as a process model 164 under program control and then output control signals to the process via the data base 160. The organization of the computer memory illustrated in FIG. 2 is typical of control computer systems and is presented here to further illustrate data handling in the computer and is not to be considered as unduly limiting the scope of this invention.

Figure 3A:
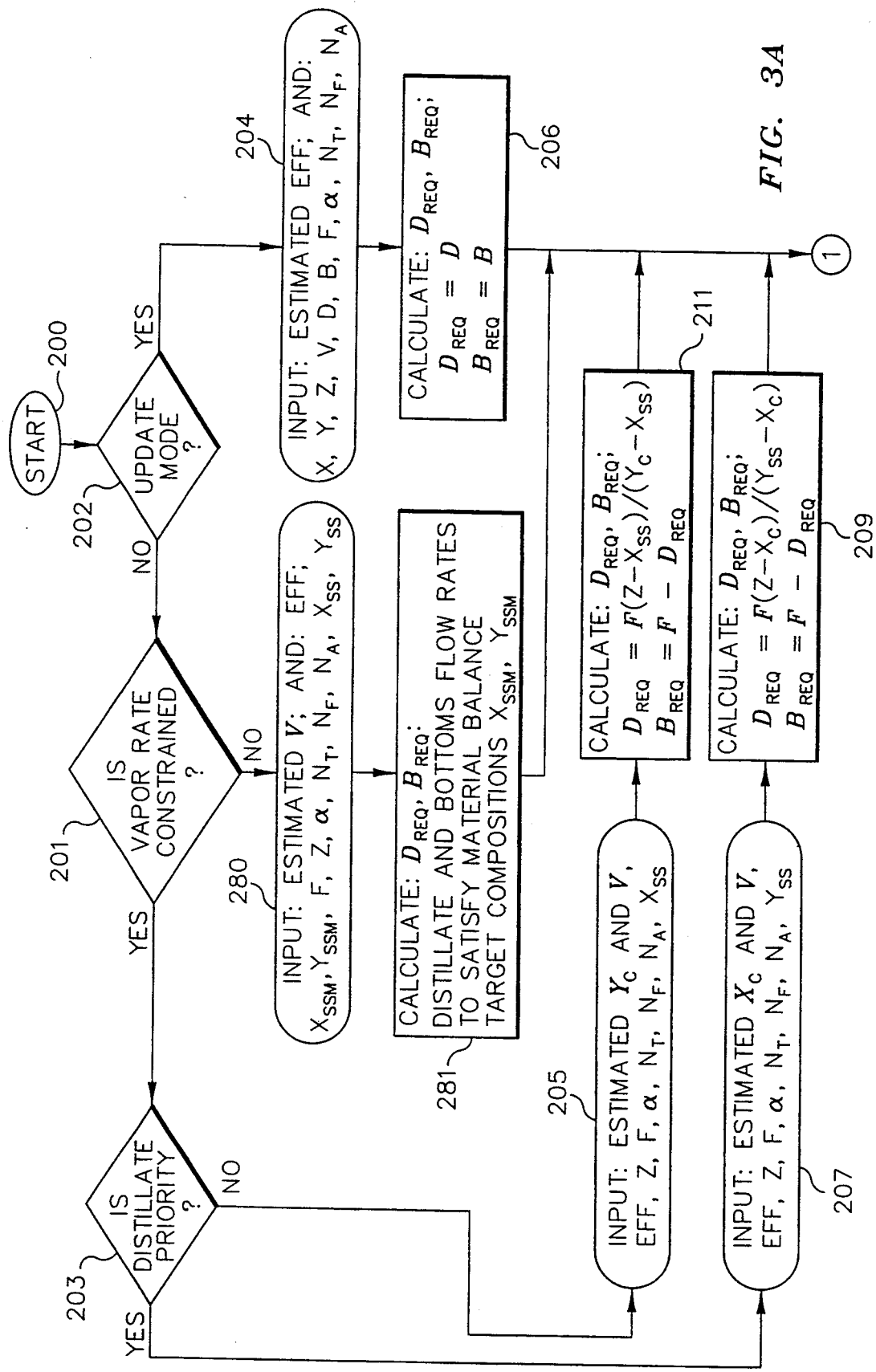
FIGS. 3A-3C illustrate a flow diagram of the nonlinear model algorithm according to the present invention.
Figure 3B:
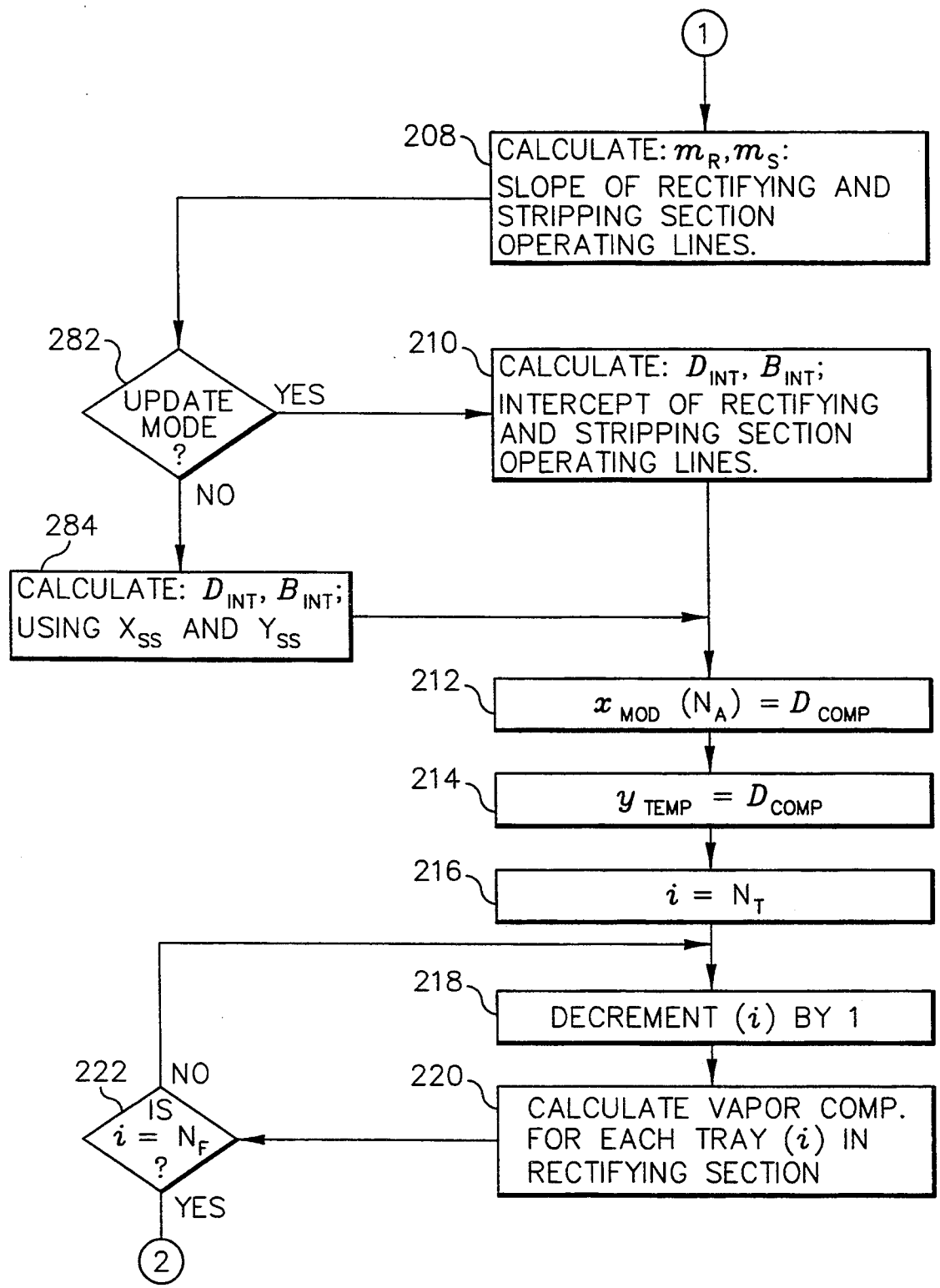
Figure 3C:
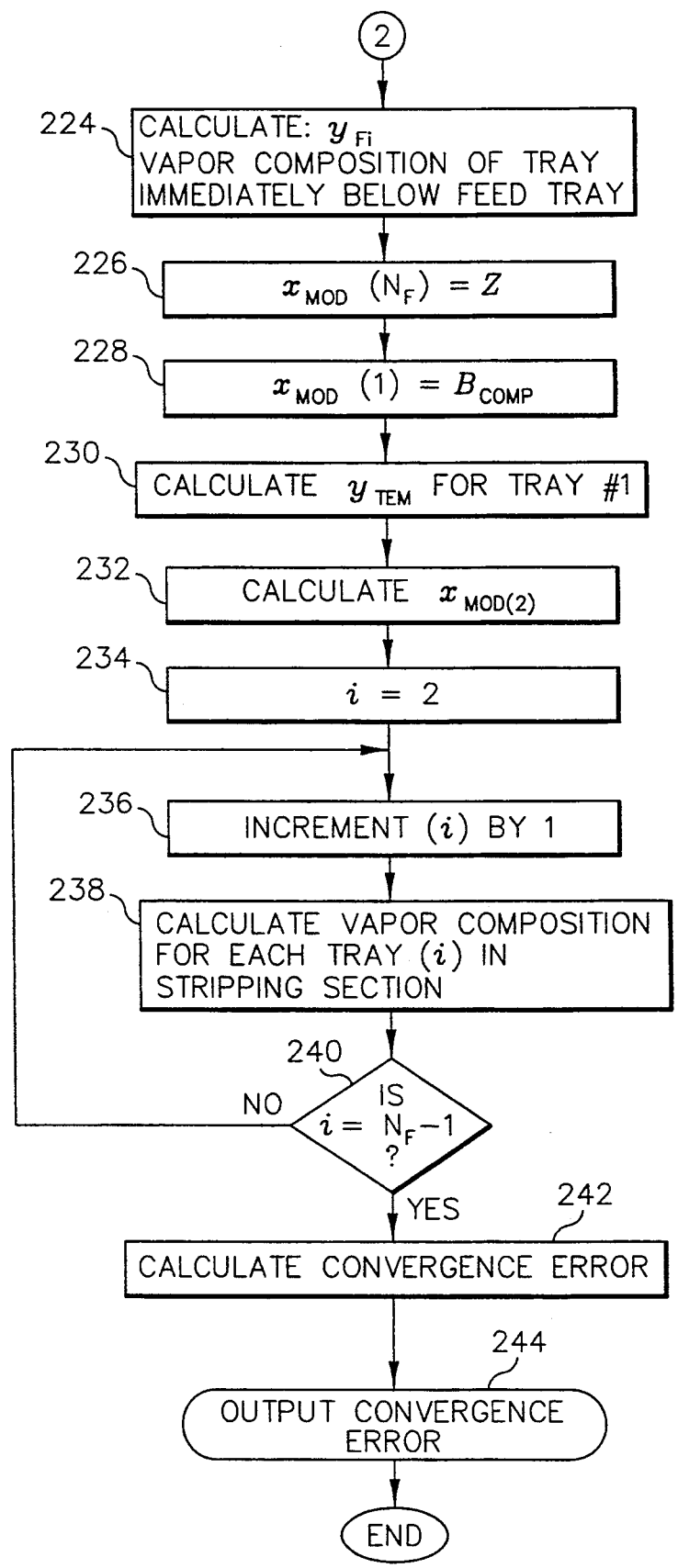
Figure 4A:
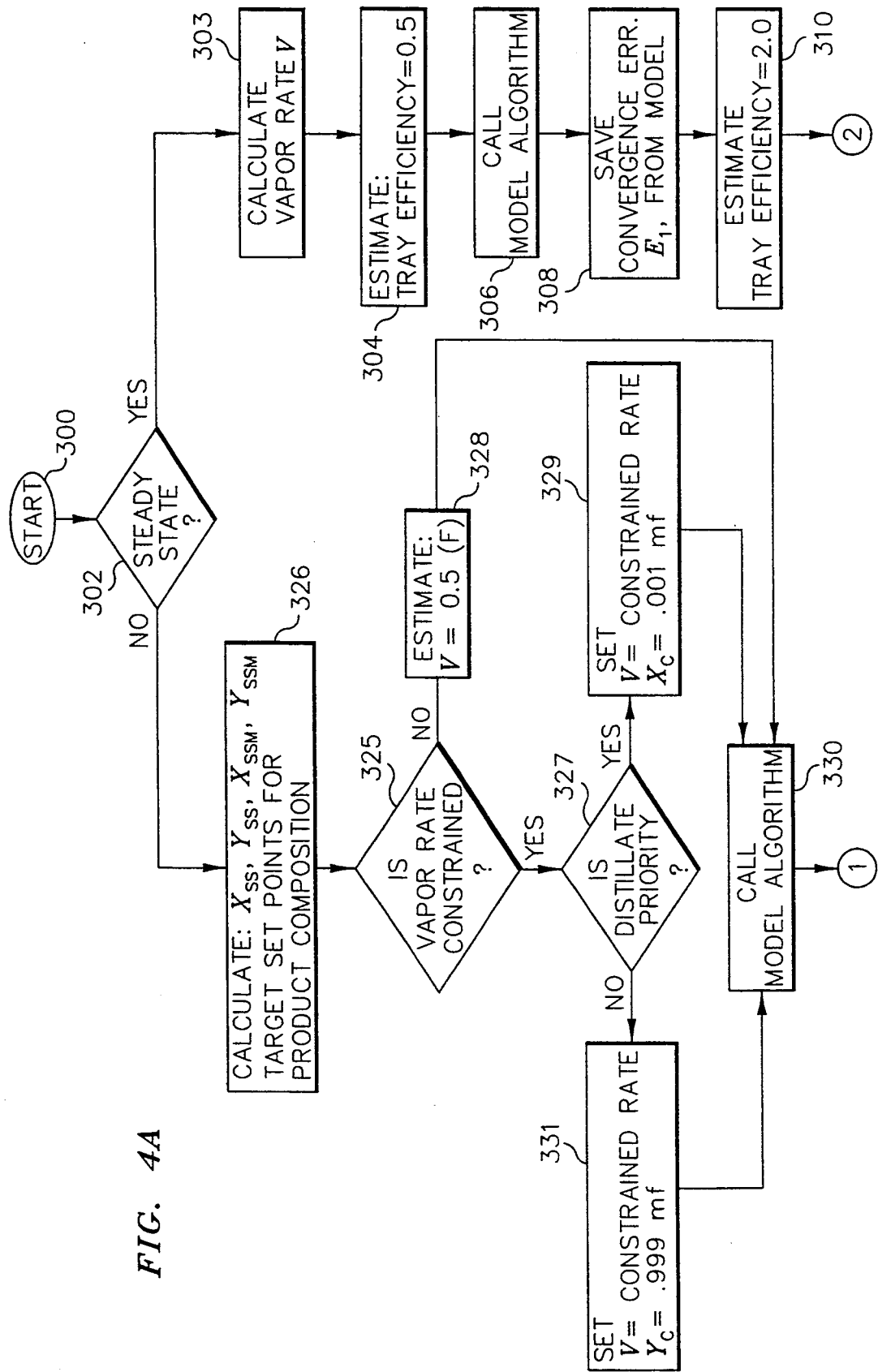
FIGS. 4A-4C illustrate a flow diagram of the mainline computer control program utilized to implement process model based control according to the present invention.
Figure 4B:
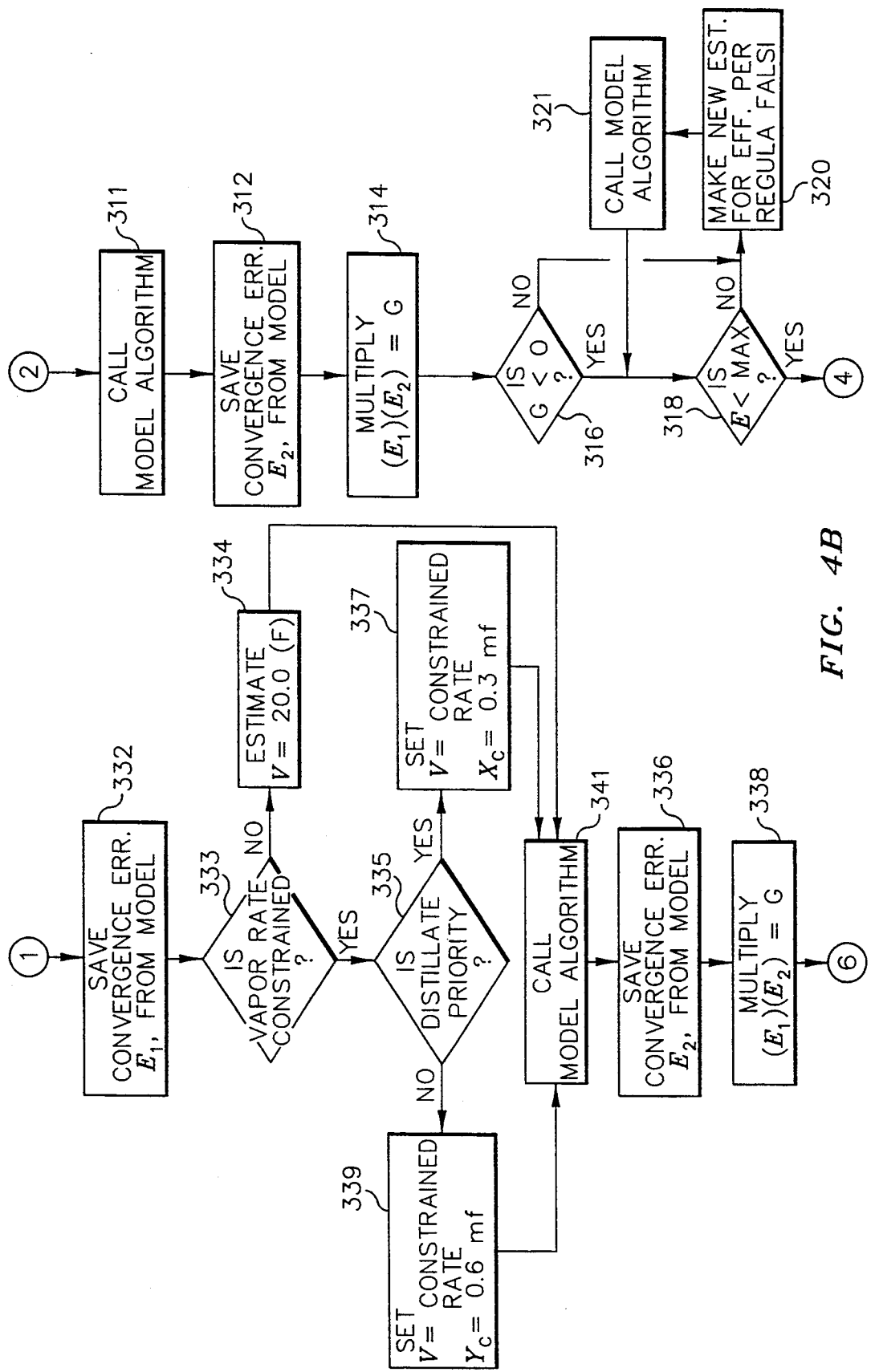
Figure 4C:
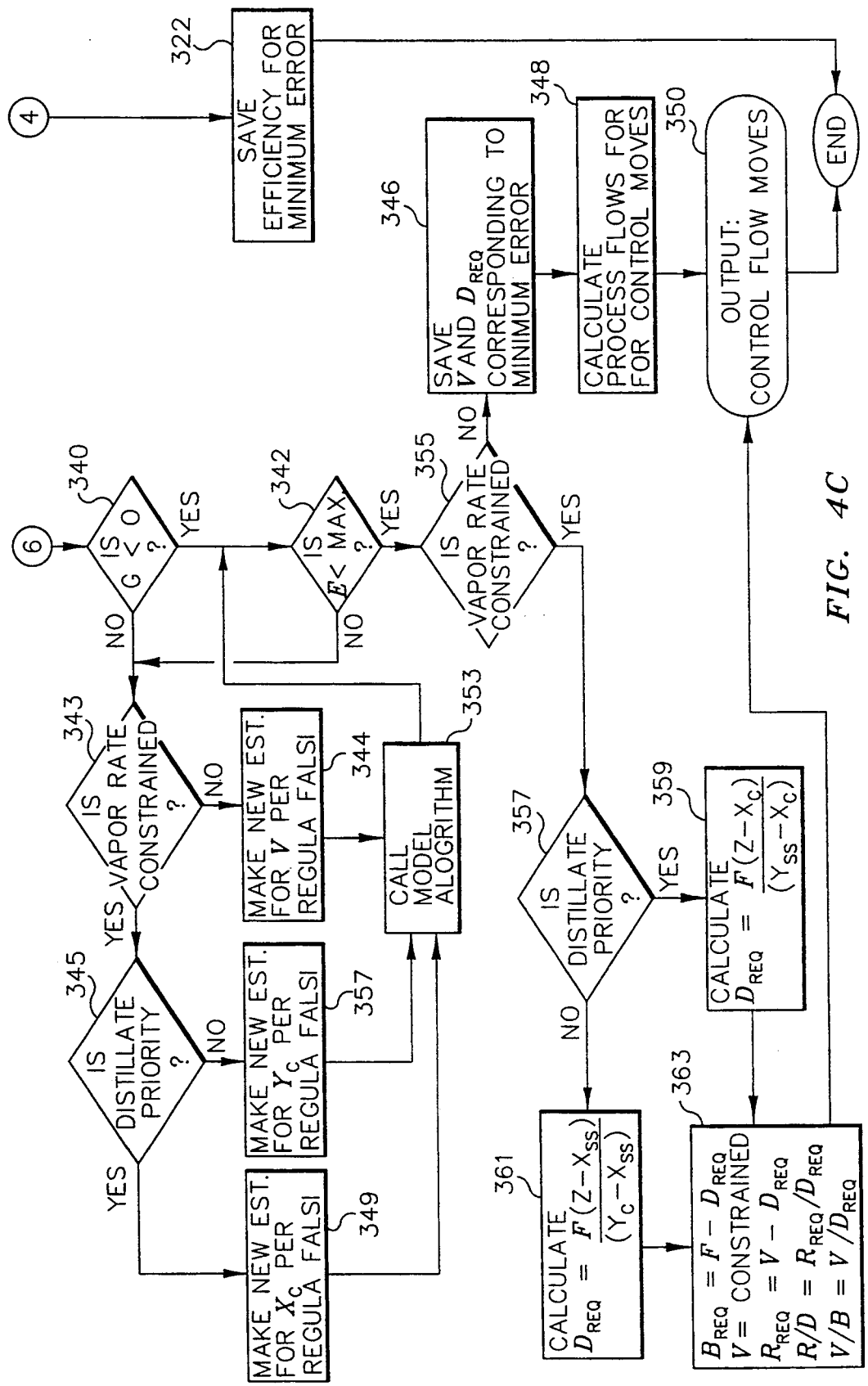

The model algorithm illustrated in the computer program flow chart of FIGS. 3A, 3B and 3C is made operative at a start step 200, when called by the computer control program illustrated in FIG. 4. Since the general sequence of steps of the model algorithm is useful for updating model parameters based on measured flow rates and compositions from the column, as well as for calculating values for process flow rates, the model algorithm program first determines in a discrimination step 202 which of the two modes of operation is desired. In the update mode, the model algorithm receives an initial estimate of the tray efficiency of the column and then relies on measured steady state variables to accurately determine the tray efficiency under current operating conditions. The updated tray efficiency is then used in the control calculations to simultaneously calculate values for two process flows which are utilized for determining set points for conventional PID controllers.

Referring still to FIG. 3A and particularly to flow block 204, which indicates that the update mode has been selected if the program reaches this step, an estimated value for tray efficiency, composition variables X, Y, Z, flow variables, V, D, B and F, along with system constants $\alpha$, $N_T$, $N_F$ and $N_A$ are input into the program. Symbols for the measured variables and the system constants used in this program are found in Table I. It is noted, however, that the numerical equations assigned for the system constants in Table I are for a particular column and are given for illustration only. Accordingly, these constants are not intended to be applicable to distillation columns in general. In flow block 201, which indicates that the control action mode has been selected if the program reaches this step, it is determined if the column vapor rate is constrained such that normal control action must be overridden. This decision will typically be based on heat input or heat removal constraints. Assuming that the vapor rate is not constrained, the model algorithm is supplied with an estimated vapor rate along with other required data in flow block 280. The estimated vapor rate is supplied in block 280 instead of an estimated efficiency compared to the corresponding input block 204 on the right hand side of FIG. 3A.

In calculation block 281, the distillate and bottoms flow rates required if both products are to achieve desired product compositions are calculated based on feed flow and feed compositions. These flow rates are calculated according to equations (1) and (2) below.

$$D_{req} = F(Z - X_{ssm})/(Y_{ssm} - X_{ssm}) \quad (1)$$

$$B_{req} = F - D_{req} \qquad (2)$$

If the vapor rate is constrained, the program proceeds to decision block 203 where it is determined if the distillate is the top priority product. Assuming that the distillate is the top priority product, which is usually the case, the model algorithm is supplied with $X_c$, which is a constrained value for bottoms composition, a value V which is the actual constrained vapor rate along with other required data illustrated in block 207. The required distillate and bottoms flow are then calculated according to the equations in computer flow block 209. If the distillate is not the top priority product, similar calculations utilizing a constrained value for distillate composition are carried out in computer flow blocks 205 and 211.

Figure 5:
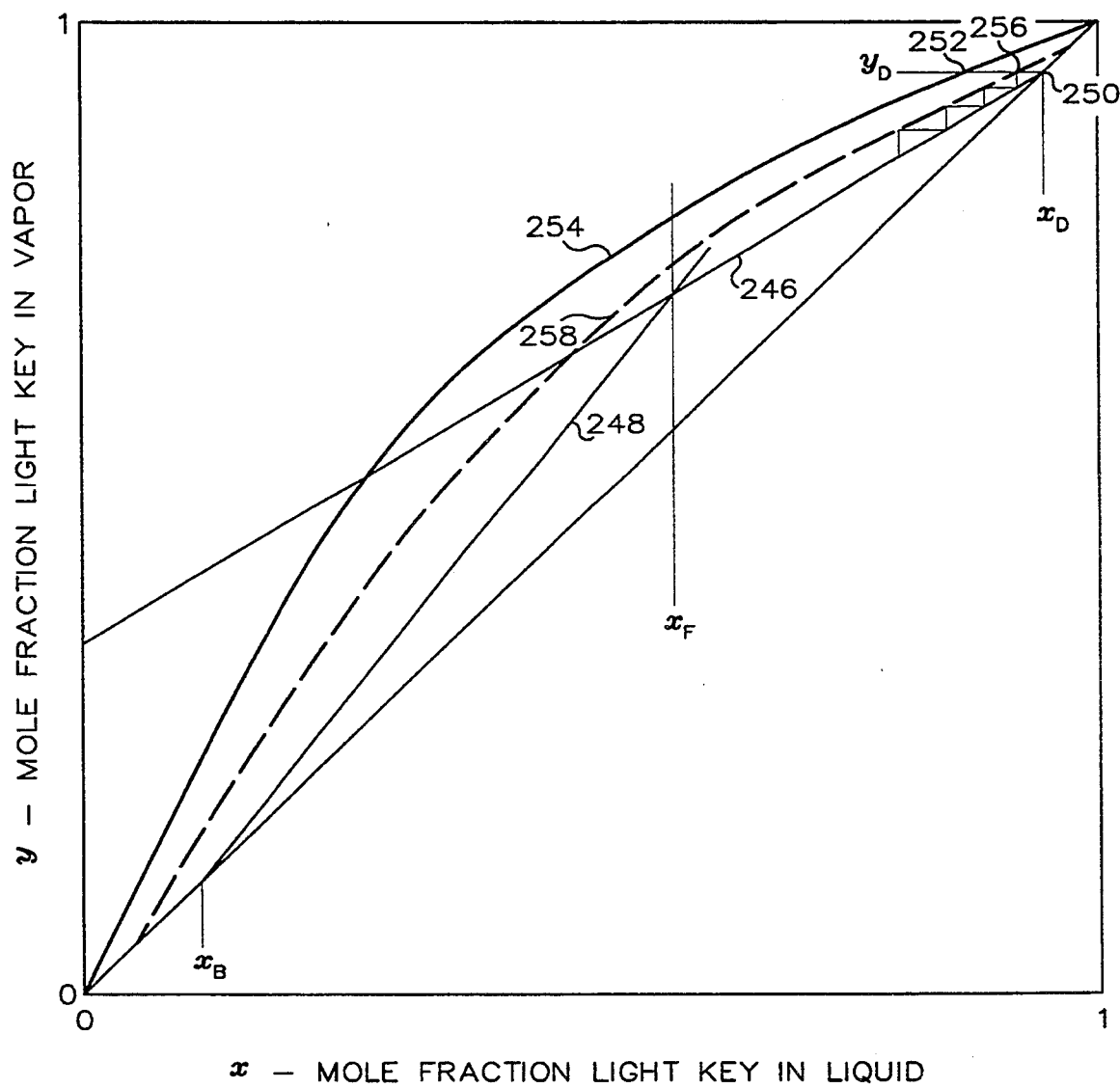
FIG. 5 is a typical McCabe-Thiele diagram for distillation column design for a liquid feed.

The program then proceeds to flow block 208 to calculate the slope of the operating lines based on a McCabe-Thiele graphical method for distillation column design, where the calculations are in accordance with overall material and component balances in the respective rectifying and stripping sections of the column. These operating lines, which are further illustrated at reference numerals 246 and 248 in FIG. 5, are designated $m_r$ and $m_s$ and are determined in accordance with equations (3) and (4) below:

$$m_r = (V - D_{req})/V \qquad (3)$$

$$m_s = (V - D_{req} + F)/V \qquad (4)$$

The intercepts of the operating lines are then calculated as illustrated in calculation block 210 also based on a McCabe-Thiele graphical method for distillation column design according to equations 5 and 6 below:

$$D_{int} = (D_{comp})(D_{req})/V \qquad (5)$$

$$B_{int} = (B_{comp})(B_{req}/(V + B_{req})) \qquad (6)$$

where: $D_{comp}$ is a variable which is representative of the actual distillate composition Y in the update mode in block 210 and is representative of the target composition $Y_{ss}$ for the distillate in the control calculation mode in block 284.

$B_{comp}$ is a variable which is representative of the actual bottoms composition X in the update mode in block 210 and is representative of the target composition $X_{ss}$ for the bottoms in the control calculation mode in block 284.

In flow diagram block 212 of FIG. 3B, an index register called $x_{mod}(\ )$ is defined. This index register 212 has capacity to handle repeated execution of a series of instructions for a number of times equal to the number of trays in the column, and is used for temporarily storing the concentration (mf) of the light key in the liquid in each tray of the column 10, and is set to an initial value for the accumulator tray vapor equal to $D_{comp}$. This composition for the accumulator tray is further illustrated at 250 on FIG. 5, where the mole fraction of the light key in the distillate equals the mole fraction of the light key in the vapor at the accumulator tray, since this accumulator tray vapor is totally condensed to form the distillate.

The mole fraction of light key in the vapor for each tray below the accumulator tray is determined in a tray-to-tray manner beginning in the accumulator tray and progressing downwardly to the feed tray. This determination is illustrated in even numbered blocks 214-222 in FIG. 3B and further illustrated in reference to a McCabe-Thiele diagram in FIG. 5. In block 214, a variable $y_{tem}$ is defined, which is representative of the concentration of light key in the vapor rising from a tray. $y_{tem}$, like $x_{mod}$, is set to an initial value of $D_{comp}$. This value of the light key in the vapor is also illustrated at 250 in FIG. 5. Next the liquid composition in the next lower tray is determined in accordance with equation 7 below by employing the concept of constant relative volatility. The equilibrium point for the tray immediately below the accumulator tray is indicated at 252 in FIG. 5, which is located on a vapor liquid equilibrium line 254.

$$x_{mod}(i) = y_{tem}/(\alpha - (\alpha - 1)(y_{tem})) \qquad (7)$$

In accordance with equation 8, the concentration of the light key in the liquid is adjusted for the estimate efficiency, as illustrated at 256 in FIG. 5, which is located on efficiency line 258, shown as a dash line in FIG. 5.

$$x_{mod}(i) = y_{tem} + (\text{Eff.})(x_{mod}(i) - y_{tem}) \qquad (8)$$

Finally, the concentration of light key in the vapor in the next lower tray is determined according to equation 9 below, which gives y as a linear function of x along the operating line of the rectifying section 246.

$$y_{tem} = (m_r)(x_{mod}(i)) + D_{int} \qquad (9)$$

This tray-to-tray stepping procedure is repeated for each tray in the rectifying section of the column until the feed tray is reached. At the feed tray, equation 10 is applied to calculate the concentration of light key in the vapor supplied to the feed tray.

$$y_{fi} = (m_s)(x_{mod}(N_F)) + D_{int} - ((F)(Z)/V) \qquad (10)$$

At the feed tray, the operating line is changed from the rectifying section operating line 246 in FIG. 5 to the stripping section operating line 248. In a manner similar to the rectifying section, the mole fraction of light key in the vapor for each tray below the feed tray is determined in a tray-to-tray manner but beginning with the bottom tray No. 1 and progressing upwardly to the feed tray. This is illustrated in even numbered blocks 226-240 in FIG. 3C and is further illustrated in FIG. 5. Referring still to FIG. 3C and block 228, the index register $x_{mod}$ is reinitialized for tray No. 1 to $B_{comp}$, which, as previously stated, is the actual concentration of light key in the bottoms product in the update mode and is the bottoms target composition in the control action calculation mode. The concentration of light key in the vapor rising from tray No. 1 is calculated based on the concept of relative volatility in equation 11. Next the concentration of light key in the liquid in tray No. 2 is calculated according to equation No. 12 based on the operating line 248 illustrated in FIG. 5.

$$y_{tem} = (\alpha)(x_{mod}(1))/((\alpha - 1)(x_{mod}(1)) + 1) \qquad (11)$$

$$x_{mod}(2) = y_{tem}/m_s + B_{int} \qquad (12)$$

The index register $x_{mod}$ is then stepped from $i=2$ to $i=N_f-1$ for determining liquid and vapor composition for each tray in the stripping section of the column, such that the concentration of light key in the vapor rising into the feed tray is determined. Equations 13, 14 and 15 are executed for each step of the index register $x_{mod}$.

$$y_{tem}=(\alpha)(x_{mod}(i))/((\alpha-1)(x_{mod}(i)+1) \quad (13)$$

$$y_{tem}=x_{mod}(i)-(\text{Eff.})(x_{mod}(i)-y_{tem}) \quad (14)$$

$$x_{mod}(i+1)=y_{tem}/m_s+B_{int} \quad (15)$$

In accordance with this invention, a convergence error is defined in block 242 which is based on the difference between the concentration of light key in the vapor rising into the feed tray, as determined by tray-to-tray calculations for the stripping section, and the concentration as determined by the calculations for the rectifying section of the column. The tray-to-tray calculations for the rectifying section start from the accumulator tray and proceed downwardly to the tray immediately below the feed tray, and the tray-to-tray calculations for the stripping section start from the bottom tray and proceed upwardly to the tray immediately below the feed tray. Minimization of the convergence error determined in equation No. 16 is carried out in the computer program illustrated in FIG. 4, as will be further explained hereinafter.

$$\text{Convergence error}=(y_{fi}-y_{tem})/y_{tem} \quad (16)$$

As has been previously stated, the model algorithm illustrated in FIGS. 3A, 3B and 3C is useful for both updating the model by determining an accurate current value for tray efficiency and also for calculating a steady state flow rate for the vapor and distillate flows, which are required if both distillate and bottoms product specifications are to be achieved.

Referring now to FIG. 4A, there is illustrated the mainline program executed by computer 100 for control action calculations required to simultaneously move both distillate and bottoms product composition toward set points. From a start step 300, the program at step 302 determines whether or not steady state conditions exist in the column. This decision will typically be based on deviation of the measured product composition from its set point at steady state conditions. Since the update procedure does not require a momentous computational effort, the model is updated and control moves are calculated on a periodic basis.

Assuming the actual set point deviation is less than some allowable maximum value and the process is near steady state conditions, the program proceeds to the parameter update branch, illustrated on the right hand side of FIG. 4A. In flow block 303, the vapor rate is calculated according to equation 17 below:

$$V=S(24)(S_H)/H_V/D_N \quad (17)$$

where S=measured reboiler steam input lb/hr

In blocks 304 and 306, the tray efficiency is estimated to be 0.5, which is a particularly low value, and this value for efficiency is transferred to the model algorithm. As has been previously explained with reference to FIG. 3C, the model algorithm returns a first convergence error which is labeled $E_1$ in block 308.

In a similar manner, as illustrated in blocks 310, 311 and 312, a convergence error $E_2$ for an unusually high efficiency is returned to the mainline program and stored in block 312. The convergence errors $E_1$ and $E_2$, which are based on purposely selected unusually high and low efficiencies so as to straddle a minimum convergence error, are multiplied in block 314 to obtain a product G. In Block 316, a determination is made as to whether or not the value of the product G is less than zero. If G is less than zero, which indicates that the values of $E_1$ and $E_2$ straddle a zero value, a further determination is made in block 318 as to whether the absolute value of E is less than some allowable maximum value for E.

If the initial value of both $E_1$ and $E_2$ is greater than the maximum allowable convergence error, which will usually be the case, and values of efficiency corresponding to $E_1$ and $E_2$ are known which cause $E_1$ and $E_2$ to bracket a zero convergence error, a new estimate of efficiency is found by a linear interpolation between points $E_1$ and $E_2$. This interpolation is performed in block 320 in accordance with the method of "regula falsi", which is a well known method for finding the root of a single nonlinear equation in one variable, and which is disclosed in numerous text books on numerical analysis, such as a text entitled "A First Course in Numerical Analysis" by Ralston and Rabinowitz, McGraw-Hill, Second Edition, pages 338–344. The efficiency determined by the method of "regula falsi", which provides an accurate value for the actual efficiency so as to update the model algorithm, is saved in block 322 for use in calculating required process flows for control actions.

Referring now to block 326, which is the first step in the control action calculation path shown on the left hand side of FIG. 4A, four values for target set points for a product composition are determined using filtered and/or lagged data for compositions of measured distillate bottoms and feed streams. The measured composition data may be filtered by any suitable means and is preferably dynamically compensated using digital filters to account for process dynamics.

Digital filtered data is used to determine derivative and integral factors, illustrated in equations 18 and 19 below.

$$Y_{de}=(Y_f-Y_{fo})/S_T \quad (18)$$

$$Y_{in}=Y_{in}+(Y-Y_{sp})(S_T) \quad (19)$$

where $Y_f$=current filtered value
$Y_{fo}$=previous filtered value
$Y_{sp}$=desired mole fraction of heavy key in the distillate.

These factors are included in equations 20 and 20(a) below, which are based on generic model control described by Lee and Sullivan, "Computer Chemical Engineering" Volume 12, No. 6, pages 573–580, 1988. Equations 20 and 20(a) include proportional, integral and derivative factors $K_{py}$, $K_{iy}$, $K_{dy}$ and $K_{pym}$, $K_{iym}$ and $K_{dym}$ respectively, which may be considered tuning factors and for which values can be chosen for these constants for optimal tuning over a large tuning band.

$$\text{ti } Y_{ss}=Y_f-K_{py}(Y_f-Y_{sp})-(Y_{in}/K_{iy})-(Y_{de})(K_{dy}) \quad (20)$$

$$Y_{ssm}=Y_f-K_{pym}(Y_f-Y_{sp})-(Y_{in}/K_{iym})-(Y_{de})(K_{dym}) \quad (20)(a)$$

Typical ranges of values for the constant factors in equations 20 and 20(a) which have been utilized in a commercial installation for a pentane splitter tower are as follows:

---

$K_{py}$ = 2 to 8        $K_{pym}$ = 4 to 25

-continued

| | |
|---|---|
| $K_{iy}$ = 2,000 to 20,000 | $K_{iym}$ = 500 to 10,000 |
| $K_{dy}$ = 500 to 4,000 | $K_{dym}$ = 500 to 15,000 |

Completely analogous equations for (18), (19) and (20) and 20 (a) are used to determine a value for $X_{ss}$ and $X_{ssm}$. The function of flow blocks 328, 330 and 332, which are executed if the vapor rate is not constrained, is similar to the functions of flow blocks 304, 306 and 308. The difference being that in the control action calculation path in block 328 an initial estimate is made for the column vapor rate and the tray efficiency previously determined in the model update path and the estimated vapor rate are utilized to calculate the actual vapor and distillate rate required. The convergence error is saved in block 332 and again in a similar manner to blocks 310, 311, 321 and even numbered blocks 312-320, blocks 333, 343 and even numbered blocks 334-344 determine a vapor rate required for achieving an acceptable convergence error.

In flow block 348, calculation of external process flows using vapor rate and distillate flow saved in block 346 is carried out. Flow rates for bottoms stream may be determined, according to equation 2. Two outputs are selected from among the variables V, D, B, R and the ratios R/D and V/B.

Referring now to computer flow block 325 in FIG. 4A, a determination is made as to whether or not the column vapor rate is constrained. If the vapor rate is constrained and if the distillate is the top priority product, the value of V used in the model calculations is set equal to the constrained rate in block 329. Also, a value for the composition of the bottoms product, $X_c$, is given in block 329 for use when column vapor rate is constrained and when the distillate is the top priority product.

In complete flow block 331, a value for the composition of the distillate product is given for use when the column vapor rate is constrained and when the distillate is not the top priority product. The program then proceeds through blocks 330 and 332, so as to save the convergence error $E_1$ as described in reference to the nonconstrained case. A similar procedure is followed in blocks 333, 335, 337, 339, 341 and 336, so as to save a second convergence error ($E_2$) determined in the model algorithm. Block 338 is analogous to block 314 in multiplying the convergence errors $E_1$ and $E_2$. The convergence errors multiplied in the first execution of block 338 are based on constrained values of distillate or bottoms composition which are selected in blocks 337 and 339, or as unconstrained in Block 334 so as to straddle a minimum convergence error.

Referring now to block 343, a decision is again made as to whether or not the column vapor rate is constrained and, if not, a new estimate is made for V per the method of "Reguli Falsi" in block 344 and a new convergence error is determined in block 353. If the vapor rate is constrained and the distillate product is the top priority, as determined in block 345, a new estimate for $X_c$ is made in block 349 per the method of "Reguli Falsi" and a new convergence error is again determined in block 353. In a similar manner, blocks 357 and 353 determine a new convergence error based on a new estimate of $Y_c$, if the distillate is not the top priority product.

Referring now to decision blocks 355 and 357, if the vapor rate is constrained and the distillate is the top priority product, the required distillate flow rate is calculated in block 359, and if the distillate is not the top priority product, the required distillate flow is calculated in block 361. Finally, two flow rates selected from R, D, V and B or ratios R/D and V/B for making control moves are calculated in block 363.

In summary, control of dual distillation product composition is accomplished in a manner which accounts for nonlinear distillation characteristics, and without interaction between variables by utilizing a nonlinear process model for on-line calculation of external flows or flow ratios which would yield desired products compositions. The non-linear process model is periodically updated by adjusting tray efficiency to keep pace with changing process operating conditions.

The invention has been described in terms of a preferred embodiment as illustrated in FIG. 1-5. Specific components used in the practice of the invention as illustrated in FIG. 1, such as flow sensors, flow transducers, flow controllers and control valves, are each well known commercially available control components, such as are described at length in "Perry's Chemical Engineer's Handbook", Fifth Edition, Chapter 22, McGraw-Hill.

For reasons of brevity, conventional auxiliary fractionation equipment, such as pumps, heat exchanger, additional measurement and control apparatus such as distillation pressure control, etc. have not been included in the above description, as they play no part in the explanation of the invention.

While the invention has been described in terms of the presently preferred embodiment, reasonable variations and modifications are possible by those skilled in the art and such variations and modifications are within the scope of the described invention and the appended claims.

TABLE 1

| | Units |
|---|---|
| Measured variable | |
| D = distillate flow rate | BPD |
| B = bottoms flow rate | BPD |
| X = bottom composition | mf light key |
| Y = distillate composition | mf light key |
| Z = feed composition | mf light key |
| F = feed flow rate | BPD |
| R = reflux flow rate | BPD |
| S = reboiler steam input flow rate | lb/hr. |
| $X_c$ = bottoms composition constrained | mf light key |
| $Y_c$ = distillate composition constrained | mf light key |
| Calculated variable | |
| V = column vapor flow rate | BPD of liquid vaporized |
| x = liquid composition | mf light key |
| y = vapor composition | mf light key |
| $Y_{ss}$ = distillate target composition | mf light key |
| $X_{ssm}$ = material balance bottoms target composition | mf light key |
| $Y_{ssm}$ = material balance distillate target composition | mf light key |
| $X_{ss}$ = bottoms target composition | mf light key |
| $X_{de}$ = bottoms derivative factor | |
| $X_{in}$ = bottoms integral factor | |
| $Y_{de}$ = distillate derivative factor | |
| $Y_{in}$ = distillate integral factor | |
| $D_{req}$ = distillate flow rate required | BPD |
| $B_{req}$ = bottoms flow rate required | BPD |
| $R_{req}$ = reflux flow rate required | BPD |
| H = heat input, | Btu/hr. |
| $m_s$ = slope of operating lines in stripping section | |
| $m_r$ = slope of operating lines in rectifying section | |
| Constants | |
| $S_H$ = Steam heating value, 914.0 Btu/lb. steam | |
| $H_v$ = Heat of vaporization per lb of H/C, | |

TABLE 1-continued

| | Units |
|---|---|
| 140 BTU/lb | |
| $D_N$ = Density of kettle reboiler liquid, 234.4 lb/bbl. | |
| $N_A$ = Accumulator tray number, 102 | |
| $N_T$ = Total number of trays, 101 | |
| $N_F$ = Feed tray, number from reboiler 55 | |
| $S_T$ = Step size, 5 min. | |
| $F_A$ = Analyzer data lag factors 0.3 | |
| $Y_{sp}$ = set point of light key in distillate | mf |
| $X_{sp}$ = set point of light key in bottoms | mf |
| $\alpha$ = relative volatility, 1.200 (vapor press ratio of iC5/nC5 at same temp.) | |
| Lg = lag factor, 0.20 | |
| Tuning Data | |
| $K_{px}$ = proportional gain, bottoms generic model control equation (heat balance) | |
| $K_{ix}$ = integral gain, bottoms generic model control equation (heat balance) | |
| $K_{dx}$ = derivative gain, bottoms generic model control equation (heat balance) | |
| $K_{py}$ = proportional gain, distillate generic model control equation (heat balance) | |
| $K_{iy}$ = integral gain, distillate generic model control equation (heat balance) | |
| $K_{dy}$ = derivative gain, distillate generic model control equation (heat balance) | |
| $K_{pxm}$ = proportional gain bottoms generic model control equation (material balance) | |
| $K_{ixm}$ = integral gain bottoms generic model control equation (material balance) | |
| $K_{dxm}$ = derivative gain bottoms genericl model control equation (material balance) | |
| $K_{pym}$ = proportional gain distillate generic model control equation (material balance) | |
| $K_{iym}$ = integral gain distillate generic model control equation (material balance) | |
| $K_{dym}$ = derivative gain distillate generic model control equation (material balance) | |

That which is claimed is:

1. A method of binary distillation column control, utilizing a computer programmed for implementing composition control for dual products of a binary distillation column, wherein said column employs a liquid overhead reflux stream (R), a heating stream (S) for generating a reboil vapor stream (V), wherein an essentially binary separation of components contained in a feed stream (F) is effected in said column, which then yields a distillate product stream (D) and bottoms product stream (B), said method comprising:

(a) storing a nonlinear steady state distillation model based on tray-to-tray calculations for said column in said computer;

(b) receiving and storing measurement data in said computer for a plurality of process variables from said column;

(c) periodically updating a parameter of said model to keep said model in pace with changing with operating conditions of said column;

(d) utilizing said model for calculating distillation flow rates which will satisfy target compositions for (B) and (D);

(e) generating a pair of control signals based on flow calculations of paragraph (d) for individually manipulating external flows coupled to said column so as to simultaneously move compositions of both (B) and (D) toward set points;

(f) detecting a constraint condition for said manipulated external flows coupled to said column;

(g) specifying which of the dual products of said column is more valuable; and (h) substituting constraining values for a plurality of process variables in said nonlinear steady state model based on tray-to-tray calculations if said constraint is encountered.

2. A method in accordance with claim 1, wherein said model includes a first pair and a second pair of generic model control equations for determining target compositions for said distillate product stream and said bottoms product stream, wherein each equation contains a plurality of tuning factors, said method additionally comprising:

using said first pair of generic model equations for calculating control actions to provide an optimum response for calculations based on heat balance; and using said second pair of generic model equations for calculating control actions to provide an optimum response for calculations based on material balance.

3. A method in accordance with claim 2 wherein each generic model control equation includes proportional, integral and derivative tuning factors, and wherein the tuning factors of said first pair of generic model control equations, herein designated $K_{py}$, $K_{iy}$, and $K_{dy}$ and wherein the tuning factors of said second pair of generic model control equations, are herein designated $K_{pym}$, $K_{iym}$, and $K_{dym}$, said method additionally comprising:

adjusting the tuning constants for said first and second pair of generic model control equations within the following ranges:

| | |
|---|---|
| $K_{py}$ = 2 to 8 | $K_{pym}$ = 4 to 25 |
| $K_{iy}$ = 2,000 to 20,000 | $K_{iym}$ = 500 to 10,000 |
| $K_{dy}$ = 500 to 4,000 | $K_{dym}$ = 500 to 15,000 |

4. A method in accordance with claim 1 wherein said step of updating a parameter of said model includes calculating a convergence error between tray compositions at the feed tray based on separate calculations for rectifying and stripping sections of said column, and wherein vapor rate (V) of said column is constrained and the distillate is selected as the more valuable product, said method additionally comprising the following steps:

setting the value for the vapor rate (V) to the constrained value;

setting a value of about 0.001 mf for the bottoms composition as a constraining value in said model for calculating a first trial convergence error; and changing the value of bottoms composition to about 0.3 mf for a constrained value for calculating a second trial convergence error, wherein values for constrained bottoms composition are selected such that said first trial convergence error and said second trial convergence error will straddle a zero convergence error value.

5. A method in accordance with claim 4 wherein said step of updating a parameter of said model further includes determining if said first and second trial convergence errors straddle a zero value, said method additionally comprising:

making a new estimate for the constrained value of bottoms composition, so as to decrease said convergence error if said first and second trial convergence errors straddle a zero value.

6. A method in accordance with claim 5, wherein the bottoms is selected as a more valuable product, said method comprising:

setting the value of the vapor rate (V) to the constrained value;

setting a value of about 0.999 mf for a constrained value of distillate composition in said model for calculating said first trial convergence error;

changing the value of distillate composition to about 0.6 mf for a constrained value for calculating said second trial convergence error, wherein values for constrained distillate composition are selected such that said first trial convergence error and said second trial convergence error will straddle a zero value.

7. A method in accordance with claim 6 additionally comprising:

making a new estimate for the constrained value of distillate composition so as to decrease said convergence error.

8. A method in accordance with claim 5 wherein the distillate flow rate (D) required to satisfy a target composition is calculated based on a constraint value of bottoms composition if the distillate is the higher priority product, and the distillate flow rate (D) required to satisfy a target composition is calculated based on a constrained value of distillate composition if the bottoms product is the higher priority product.

* * * * *